(12) United States Patent
Ros et al.

(10) Patent No.: US 7,876,832 B2
(45) Date of Patent: Jan. 25, 2011

(54) METHOD FOR THE CHARACTERIZATION OF A DIGITAL IMAGE AND THE APPLICATIONS THEREOF

(75) Inventors: Julien Ros, Grenoble (FR); Christophe Laurent, Vignoc (FR)

(73) Assignee: France Telecom, Paris (FR)

( * ) Notice: Subject to any disclaimer, the term of this patent is extended or adjusted under 35 U.S.C. 154(b) by 900 days.

(21) Appl. No.: 11/597,482

(22) PCT Filed: May 24, 2004

(86) PCT No.: PCT/FR2004/001280

§ 371 (c)(1),
(2), (4) Date: Jun. 8, 2007

(87) PCT Pub. No.: WO2006/000651

PCT Pub. Date: Jan. 5, 2006

(65) Prior Publication Data

US 2008/0317352 A1 Dec. 25, 2008

(51) Int. Cl.
*H04N 11/02* (2006.01)

(52) U.S. Cl. .................... 375/240.19; 382/190; 382/209

(58) Field of Classification Search ............. 375/240.19
See application file for complete search history.

(56) References Cited

U.S. PATENT DOCUMENTS

| | | | |
|---|---|---|---|
| 6,836,569 B2 * | 12/2004 | Le Pennec et al. | 382/260 |
| 2003/0031369 A1 * | 2/2003 | Le Pennec et al. | 382/232 |
| 2008/0317352 A1 * | 12/2008 | Ros et al. | 382/191 |

FOREIGN PATENT DOCUMENTS

| | | |
|---|---|---|
| EP | 0 684 577 A | 11/1995 |
| FR | 2 693 580 A | 1/1994 |

OTHER PUBLICATIONS

Le Pennec, E., Mallet, S., "Image Compression with Geometrical Wavelets", Image Processing, 2000. Proceedings. 2000 International Conference on, pp. 661-664, vol. 1, ISBN: 0-7803-6297-7.*
Brooks et al., "Recognition in the Wavelet Domain: A Survey", Journal of Electronics Imaging, SPIE + IS&T, US, vol. 10, No. 3, Jul. 2001, pp. 757-784.

* cited by examiner

*Primary Examiner*—Sath V Perungavoor
(74) *Attorney, Agent, or Firm*—Cohen Pontani Lieberman & Pavane LLP (57) ABSTRACT

A method of characterizing a digital image, in which a point of interest (PI) in the detected in the image. For each θ of a plurality I of different prescribed orientations in the digital image a family $\{f_\theta^{(k)}(n)\}_{1 \leq K \leq K}$ of K one-dimensional lines $f_\theta^{(k)}(n)$ of points is extracted from a region (RPI) of the image along K straight lines of orientation (θ), and for each line $f_\theta^{(k)}(n)$ and for each sub-sampling level s, a foveal energy signal $E_{\theta,s}^{(k)}(n)$ is calculated using foveal wavelets. The signals $E_{\theta,s}^{(k)}(n)$) on the K lines and their arguments n are used to calculate a foveal signature SI characterizing the working region.

19 Claims, 6 Drawing Sheets

FIG.1

| F | : convolution with filter F |
| ↓x₂ | : sub-sampling by a factor of 2 in columns |
| ↓y₂ | : sub-sampling by a factor of 2 in rows |

Salient branch = {12, 9, 24}.

| | IMAGE N° | DISTANCE |
|---|---|---|
| $I_1$ | 102 | 0 000000 |
| $I_2$ | 139 | 6459 464355 |
| $I_3$ | 274 | 6837 875488 |
| $I_4$ | 303 | 6945 535156 |
| $I_5$ | 171 | 7408 489746 |
| $I_6$ | 181 | 7665 365723 |

METHOD FOR THE CHARACTERIZATION OF A DIGITAL IMAGE AND THE APPLICATIONS THEREOF

RELATED APPLICATIONS

This is a U.S. National Phase Application under 35 USC 371 of International Application PCT/FR2004/001280, filed on May 24, 2004.

FIELD OF THE INVENTION

The invention relates to a method of characterizing a digital image and to applications thereof.

BACKGROUND OF THE INVENTION

In numerous applications, such as recognizing images, for example, it is desired to extract characteristics from digital images in order to discriminate between them.

Methods of detecting points of interest or "salient" points in an image are known for this purpose, for example from reference [6]. Such points of interest are points containing a large amount of information and they can be situated, for example, on the outlines of shapes present in the image. These points of interest can be defined as being points corresponding to high frequency zones in the image.

Several techniques are known for characterizing images.

Thus, a first category of techniques categorize color, e.g. using an autocorrelogram or a color histogram, as in references [7], [8], [9], mentioned below.

In a second category, according to reference [10] mentioned below, texture is characterized with the help of Gabor filters.

Finally, in a third category, according to reference [11] mentioned below, form is characterized with the help of a histogram of orientation distribution in the image. An approach of that type is used in the MPEG7 standard.

Those techniques nevertheless present the drawback of not characterizing localized singularities in the image.

SUMMARY OF THE INVENTION

The invention seeks to mitigate the drawbacks inherent to the prior art and to obtain a method of characterizing a digital image making use of its points of interest, in order to make the characterization that is performed more discriminating.

To this end, in a first aspect, the invention provides a characterization method for characterizing a digital image in which at least one point of interest in the digital image is detected in association with a region of the image presenting high frequencies, the method being characterized by the steps of:

selecting a first determined two-dimensional working region of the image digital, of size smaller than the size of the image and containing the detected point;

for each of a plurality of different prescribed orientations in the digital image;

extracting a family of one-dimensional lines of points from the first two-dimensional working region along straight lines having said orientation; and calculating for each one-dimensional line of points of the extracted family and for each sub-sampling level selected from prescribed sub-sampling levels, a foveal energy signal using foveal wavelets; and using the foveal energy signals on the lines and on their arguments to calculate a foveal signature depending on the orientations and the levels of sub-sampling and characterizing the working region.

The invention thus makes it possible to calculate a signature for the local environment of the point of interest, situated in the working region, and to characterize said point of interest.

According to other characteristics of the invention:

the foveal energy signal $E_{\theta,s}^{(k)}(n)$ is equal to:

$$E_{\theta,s}^{(k)}(n) = |\Sigma_m f_\theta^{(k)}(m) \cdot \psi_s^{(1)}(n-m)|^2 + |\Sigma_m f_\theta^{(k)}(m) \cdot \psi_s^{(2)}(n-m)|^2,$$

where:

$\theta$ designates each of said plurality of I orientations;

$\{(f_\theta^{(k)}(n))\}_{1 \leq k \leq K}$ designates said family of said K one-dimensional lines $f_\theta^{(k)}(n)$ of points extracted for each orientation $\theta$;

K is a natural integer prescribed for each orientation $\theta$;

s designates each level of sub-sampling amongst said J prescribed levels of sub-sampling;

n designates the argument of the foveal energy signals $E_{\theta,s}^{(k)}(n)$; and $\{\psi_j^{(1)}, \psi_j^{(2)}\}_{1 \leq j \leq s}$ is a basis of said foveal wavelets, going as far as sub-sampling level s, of the foveal space $V_s$ of discrete one-dimensional signals $\{\psi_j^{(1)}\}_{1 \leq j \leq s}$ being a basis of odd foveal wavelets and $\{\psi_j^{(2)}\}_{1 \leq j \leq s}$ being a basis of even foveal wavelets.

the basis of odd foveal wavelets $\{\psi_j^{(1)}\}_{1 \leq j \leq s}$ is defined by:

$$\psi_j^{(1)}(n) = \Phi_j(n) \cdot \text{sign}(n-\tfrac{1}{2}) - 2^{31\ 1/2} \cdot \Phi_{j-1}(n) \cdot \text{sign}(n-\tfrac{1}{2}),$$

the basis of even foveal wavelets $\{\psi_j^{(2)}\}_{1 \leq j \leq s}$ is defined by:

$$\psi_j^{(2)}(n) = \Phi_j(n) - 2^{1/2} \cdot \Phi_{j-1}(n),$$

where:

sign(t) is the sign function of the real variable t, equal to +1 for t greater than 0 and equal to −1 for t less than 0; and $\Phi_j(t)$ being the even function of the real variable t satisfying;

$$\int_{-\infty}^{+\infty} \Phi_0(t) \cdot dt \neq 0$$

the foveal wavelet basis $\{\psi_j^{(1)}, \psi_j^{(2)}\}_{1 \leq j \leq s}$ are constructed from spline functions $\Phi_j(t)$ defined by:

$\Phi_0(t)=1$ for $-1 \leq t \leq +t$, and 0 elsewhere; and $\Phi_0(t) = \int_{-\infty}^{t} (\Phi_{j-1}(2x) - \Phi_{j-1}(x)) \cdot \text{sign}(x) \cdot dt$ for $j \geq 1$;

the family of one-dimensional lines of points along straight lines from the first two-dimensional working region is extracted using the Bresenham algorithm enabling sloping straight lines to be plotted on a discrete grid;

said foveal signature is calculated by statistically processing foveal energy signals on the lines and on their arguments;

said foveal signature SI is equal to:

$$SI = (\mu_{is}\sigma_{is})_{1 = i = I,\ 1 = s = J}$$

with $\mu_{is} = (1/NM) \cdot \Sigma_k \Sigma_n E_{i,s}^{(k)}(n)$ corresponding to the mean of the foveal energy signal $E_{i,s}^{(k)}(n)$ for the orientation i and the sub-sampling level s over the working region;

$\sigma_{is} = (1/NM) \cdot [\Sigma_k \Sigma_n (E_{i,s}^{(k)}(n) - \mu_{is})^2]^{1/2}$ corresponding to the standard deviation of the foveal energy signal $E_{i,s}^{(k)}(n)$ for the orientation i and the sub-sampling level s over the working region; and NM corresponds to the size of the working region;

the first two-dimensional working region surrounds the detected point and is of a size that is less than one-tenth of the size of the digital image;

the first two-dimensional working region surrounds the detected point and is of a size less than or equal to 15 pixels×15 pixels;

said plurality of different prescribed orientations in the digital image subdivide the angular sector going from −90° to +90° relative to the horizontal in equal angles;

the number of said orientations is eight; and the foveal signature is associated with the digital image and is stored in memory in association with said digital image.

In a second aspect, the invention provides the application of the characterization method to digital images for comparison purposes, in which the foveal signatures calculated for the digital images are compared with one another.

For example, a reference foveal signature is calculated for a reference image and, in order to compare foveal signatures, a distance relative to the reference signature is calculated for the foveal signatures calculated for the other images, the image closest to the reference image being the image having the shortest distance relative thereto.

In another example, a prescribed number of the images closest to the reference image are selected.

A third aspect of the invention is the application of the characterization method to recognizing shapes in the digital image, in which the foveal signature is used to characterize a shape situated in the working region.

For example, this application relates to recognizing faces, in which the foveal signature is used to characterize a feature of the face, situated in the working region.

A fourth aspect of the invention is the application of the characterization method to indexing digital images by partial request, in which digital images containing an item specified by the request are extracted from a digital image base, a digital image being determined as containing said item when the distance of the foveal signature calculated for said image relative to the foveal signature calculated for the item situated at least in part in the working region is less than a prescribed threshold.

A fifth aspect of the invention is the application of the characterization method to classifying digital images by comparing their foveal signatures.

BRIEF DESCRIPTION OF THE DRAWINGS

The invention can be better understood on reading the following description given purely by way of non-limiting example and with reference to the accompanying drawings, in which:

FIGS. 1 to 5, 6a and 6b show an example of detecting points of interest implemented using the method specified in Appendix 1, i.e.:

DETAILED DESCRIPTION OF THE DRAWINGS

By way of example, the invention comprises the following steps:

detecting salient points;

for each salient point, extracting K lines (preferably 8 lines) from K orientations of a neighborhood of the salient point (e.g. a 5×5 neighborhood);

projecting each line on a foveal wavelet basis (e.g. obtained using splines);

obtaining a set of (K×number of levels) coefficients (foveal response amplitude): e.g. (24× number of points in each line) coefficients;

carrying out a statistical study on these coefficients by level and by orientation (mean, standard deviation);

storing this information for each salient point of the image, associated with the image; and comparing this reference with an image for analysis in order to characterize its distance from said reference using means known in the prior art.

Figure 7:
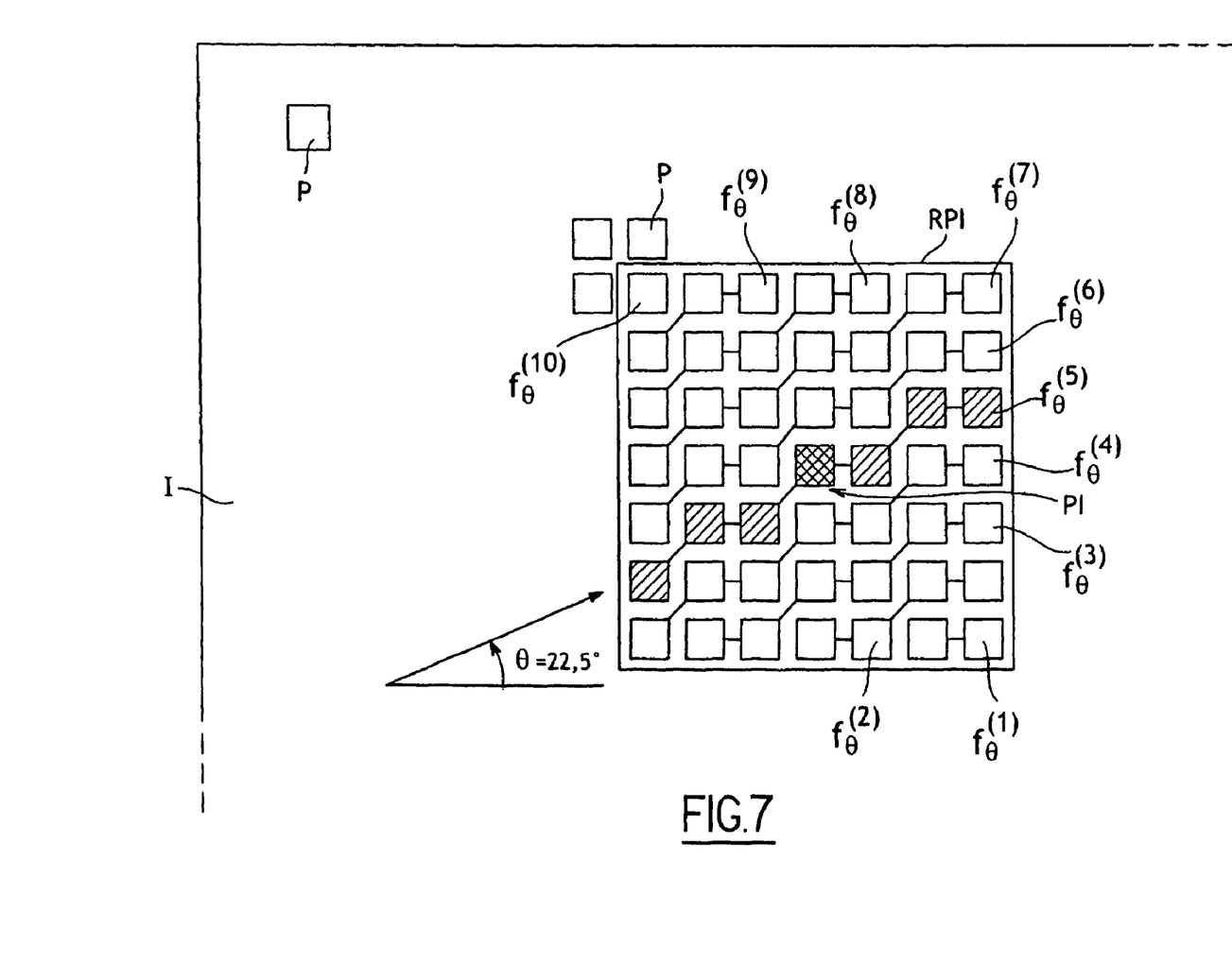
FIG. 7 is a diagram of a digital image on which the characterization method of the invention is applied, pixels being represented therein by juxtaposed squares.

FIG. 7 shows a digital image I constituted by N columns×M lines of points or pixels P, in color or in black and white.

During a first step of the method of the invention, one or more points of interest PI are detected amongst the P points of the digital image I.

Below, it is assumed that the point of interest PI of FIG. 7 has been detected. By way of example, points of interest are detected using the method of detecting points of interest or salient points as described in Appendix 1, reference [6], and FIGS. 1 to 5, 6a, 6b, which method implements a wavelet transformation associating an subsampled image with a source digital image, the subsampled image being referred to as a scale image and the wavelet coefficients corresponding to at least one detail image for at least one level of decomposition, a point of interest being a point associated with a region of the image presenting high frequencies, and the method comprising the following steps:

applying said wavelet transformation to said source image;

constructing a single tree from the wavelet coefficients of each of said detail images; and selecting at least one point of interest by analyzing said tree.

Naturally, points of interest can be detected using methods other than that described in Appendix 1 and FIGS. 1 to 6.

During a second step, a two-dimensional working region RPI around the point of interest PI is selected in the image I. By way of example, this working region RPI is rectangular or square parallel to the sides of the image I and is of a size considerably smaller than the image I. By way of example, the region RPI is centered on the point of interest PI, e.g. having odd numbers of pixels in its rows and in its columns. For example, in FIG. 7, the region RPI is constituted by a 7×7 pixel square, with the center pixel being occupied by the point of interest PI. Naturally, the working region RPI could be non-rectangular in shape, while still containing the point PI.

During a second step, lines $f_\theta^{(k)}(n)$ are extracted from the working region RPI along straight lines of orientation θ relative to the horizontal. This extraction is performed for a plurality of prescribed orientations θ. By way of example, these orientations θ are spaced apart from one another by the same angle. For example, they are equal to:

$\theta = i \cdot \pi/I + \beta$ in the range $-I/2 < i \leq +I/2$

Figure 8:
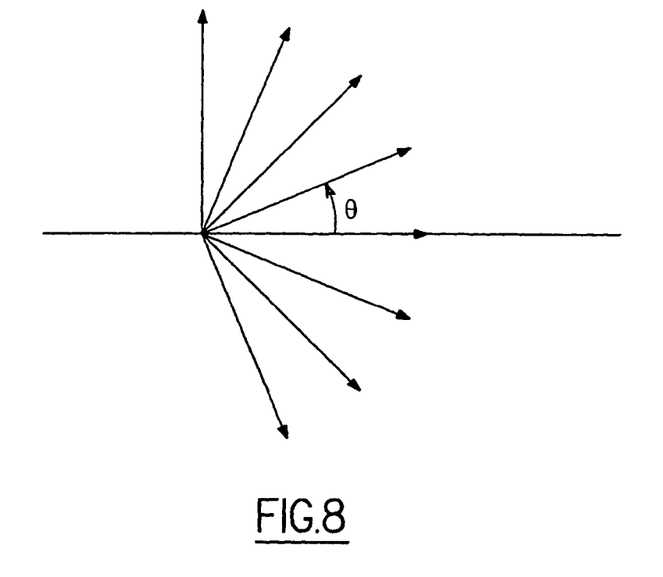
FIG. 8 is a diagram showing an example of orientations in the image of FIG. 7, as used in the characterization method of the invention.

For example, in FIG. 8, I=8 orientations θ are provided respectively at:

$$\frac{-3\pi}{8}, \frac{-\pi}{4}, \frac{-\pi}{8}, 0, \frac{\pi}{8}, \frac{\pi}{4}, \frac{3\pi}{8}, \frac{\pi}{2}$$

By way of example, the extraction of the lines $f_\theta^{(k)}(n)$ is shown for $$\theta = \frac{\pi}{8}$$

in FIG. 7. For each orientation θ, the lines $f_\theta^{(k)}(n)$ are thus inclined at the angle θ relative to the horizontal.

The lines of points are, for example, traced using the Bresenham algorithm of reference [12] mentioned below, that enables lines to be traced on an image made up of discrete points. That algorithm is used in particular for displaying sloping straight line segments on a computer screen. For a line $y = a \cdot x + b$ that is to be traced between two points $(x_1, y_1)$ and $(x_2, y_2)$ on the discrete raster of screen points, the coordinates of the points of the segment are given by $y = \text{round}(ax+b)$ for all x lying in the range $x_1$ to $x_2$, with the rounding function returning the closest natural integer.

Thus, the algorithm for tracing inclined straight line segments on a discrete raster can be implemented as follows:
for orientations θ lying in the range 0 to 45°, for x increasing one pixel pitch step to the right relative to the preceding pixel, y is taken on or below the 45° diagonal calculated relative to the preceding pixel as a function of the value of the orientation θ, i.e. the pixel situated immediately to the right of the preceding pixel, and thus having the same value for y, or the pixel situated immediately to the right and above the preceding pixel; and
for θ lying in the range 45° to 90°, the roles of x and y are interchanged.

According to the invention, K lines $f_\theta^{(k)}(n)$ are extracted from the working region RPI for each orientation θ, representing K parallel straight lines at said orientation θ, crossing the region RPI, and each offset by one pixel in the abscissa and/or the ordinate direction. K is a natural integer depending on each orientation θ, or constant for all I orientations θ. Extraction is performed in such a manner as to cover for each orientation θ all of the points of the region RPI. Consequently, for each orientation θ, each point of the working region RPI belongs to a single line $f_\theta^{(k)}(n)$ as extracted in this way. Naturally, line $f_\theta^{(k)}(n)$ could be extracted from the region RPI that do not cover all of the points thereof. According to the invention, provision is made for at least one line containing the point of interest PI in the orientation θ to be extracted from the working region RPI ($f_\theta^{(5)}$ in FIG. 7), and also at least one other line containing another point of the working region RPI, e.g. second and third lines situated on either side of the line containing the point of interest PI, such as the line $f_\theta^{(7)}$ and $f_\theta^{(3)}$ in the above example of FIG. 7.

The family $\{f_\theta^{(k)}(n)\}_{1 \leq k \leq K}$ of lines $f_\theta^{(k)}(n)$ is determined in the working region RPI for each of the selected I orientations θ. The lines $f_\theta^{(k)}(n)$ are thus one-dimensional discrete signals having as argument n giving the number of the point in the line and having as value the value of the point n of said line in the working region RPI, e.g. its gray level in the image I.

During a third step, for each extracted line $f_\theta^{(k)}(n)$, a foveal energy signal $E_{\theta,s}^{(k)}(n)$ is calculated where s indicates one sub-sampling level taken from amongst J prescribed sub-sampling levels for which the signal is calculated, where $-s$ gives a level of resolution.

The theory of foveal wavelets is summarized below.

For a rectangular image of size A×B, sub-sampling leads to a rectangular image of size A'×B' smaller than the size A×B.

Reference can be made to Appendix 2 and to reference [5] mentioned below for foveal wavelet theory.

Foveal wavelets are constituted for all dyadic expansions of a symmetrical or even wavelet $\psi^{(2)}$ and of an antisymmetrical or odd wavelet $\psi^{(1)}$, these wavelets being constructed from a mother function Φ.

The foveal energy signal is equal to:

$$E_{\theta,s}^{(k)}(n) = |<f_\theta^{(k)}(m), \psi_{s,m}^{(1)}(n)>|^2 + |<f_\theta^{(k)}(m), \psi_{s,m}^{(2)}(n)>|^2$$

where:

$$\psi_{s,m}^{(1)}(n) = \psi_s^{(1)}(n-m)$$

and $$\psi_{s,m}^{(2)}(n) = \psi_s^{(2)}(n-m),$$

by analogy with the continuous case in which $g_{s,u}(t) = 2^{-s/2} \cdot g(2^{-s}(t-u))$ is a function of the real variable t, obtained by translation of u and expansion of the sub-sampling level $2^{-s}$.

Consequently, $$E_{\theta,s}^{(k)}(n) = |\Sigma_m f_\theta^{(k)}(m) \cdot \psi_s^{(1)}(n-m)|^2 + |\Sigma_m f_\theta^{(k)}(m) \cdot \psi_s^{(2)}(n-m)|^2.$$

During a fourth step, the foveal signature SI is calculated from foveal energy signals $E_{\theta,s}^{(k)}(n)$ in order to characterize the working region RPI and the digital image I.

In this foveal signature SI, the variables k representing the various lines extracted for a given orientation θ in the working region RPI, and the argument n are eliminated from the foveal energy signal $E_{\theta,s}^{(k)}(n)$ so that the foveal signature SI depends only on the selected I orientations θ and on the J prescribed sub-sampling levels. By way of example, the foveal signature SI might be equal to:

$$SI = (\mu_{is}, \sigma_{is})_{1=i=I, 1=s=J} = (\mu_{00}, \sigma_{00}, \mu_{10}, \sigma_{10} \ldots \mu_{IJ}, \sigma_{IJ})$$

with
$\mu_{is} = (1/NM) \cdot \Sigma_k \Sigma_n E_{i,s}^{(k)}(n)$ corresponding to the mean of the foveal energy signal $E_{i,s}^{(k)}(n)$ in orientation i and the sub-sampling level s over the working region RPI;

$\sigma_{is} = (1/NM) \cdot [\Sigma_k \Sigma_n (E_{i,s}^{(k)}(n) - \mu_{is})^2]^{1/2}$ corresponding to the standard deviation of the foveal energy signal $E_{i,s}^{(k)}(n)$ depending on the orientation i and the sub-sampling level s over the working region RPI; and NM corresponding to the size of the working region RPI.

In the above, m, n, k, K, s, j, I, J, i are natural integers.

For a working region that is square, $NM = N^2$.

The foveal signature SI can be used in various ways, as described below.

By way of example, the foveal signature SI associated with the digital image is stored in memory in association therewith.

In a first application, a plurality of digital images are compared with one another by means of their foveal signatures.

The foveal signatures are compared by means of a conventional $L^2$ distance, for example.

For example, images are compared with a reference image, in order to determine which images are the closest or the most similar to the reference image, which is determined as being the image for which the foveal signature has the shortest distance relative to the foveal signature of the reference image.

Figure 12:
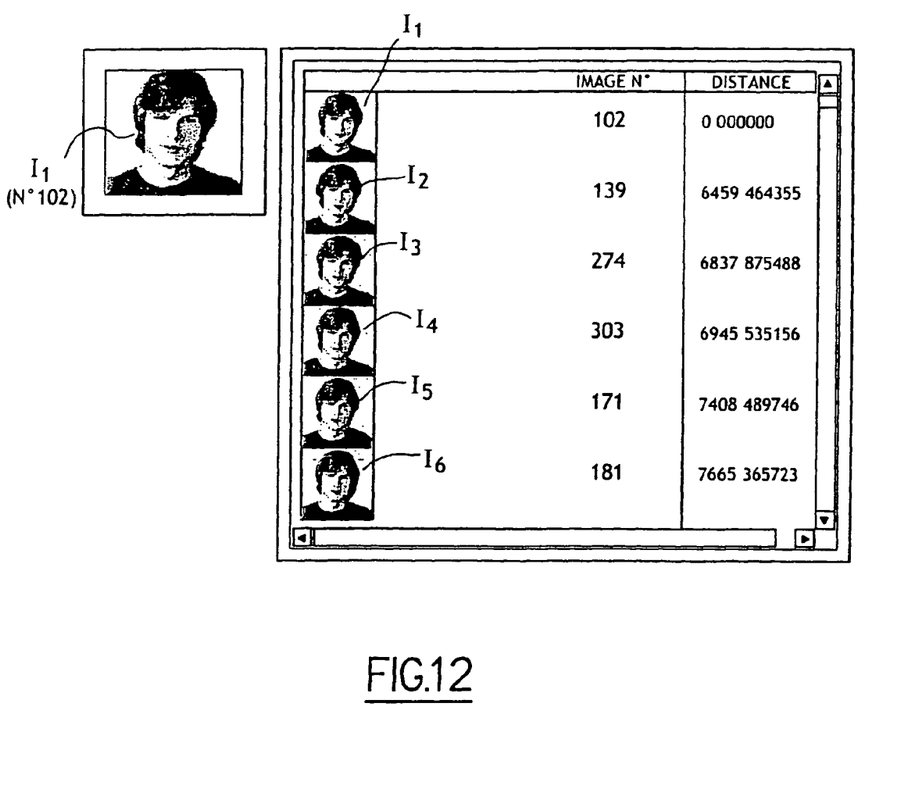
FIG. 12 is a diagram showing an example of the characterization method of the invention being applied for searching images in an image base.

Thus, by way of example, the reference image is the large image I1 on the left in FIG. 12. This image represents a person.

If it is desired to select images of the same person from an image base, the foveal signature of the reference image I1 is calculated and it is compared with the foveal signatures of other images stored in the base, in order to extract those that have the shortest distances relative to the foveal signature of the reference image I1. Thus, this extraction produces again the image I1 at distance 0, together with images I2, I3, I4, I5, and I6 at short and increasing distances from the reference image I1 these images corresponding to images Nos. 102, 139, 274, 303, 171, and 181 in a base of 700 images. It can thus be seen that the images I2, I3, I4, I5, and I6 are images of the same person as in the image I1 but with different facial expressions than in the image I1, these images being taken in succession while the person was speaking. In contrast, an image of some other person would have a signature with a much greater distance from the reference image I1 than the distances of images I2 to I6.

A second application is recognizing shapes in an image. In this application, the point of interest is detected as forming part of the outline of the shape to be recognized. The working region then contains in full or in part the shape to be recognized and the foveal signature of all or part of this shape to be recognized is obtained. This shape may be a feature of a face, such as an eye, the mouth, or the nose, which are zones having outlines that are well-marked. Since the features of the face of a person are characteristic of that person, this application makes it possible to search for people in images or to search for images containing a particular person.

A third application concerns indexing digital images by partial requests, thus making it possible to extract from an image base all of the images that contain an item similar to a request item specified by the user.

A fourth application is classifying images, enabling images in an image base to be grouped together in a small set of groups, each group presenting some particular theme (landscape, sport, etc. . . . ). This application can help in browsing through image bases, for example bases of images created by users with their digital cameras.

Naturally, the method of the invention operates with any mathematical tool having the same characteristics as the above-described foveal wavelet basis.

In addition, the method of the invention applies to characterizing any digital item, which may be a two-dimensional image as described above, but which could also be a three-dimensional image, in which case the lines should be considered as planes, and the steps of the method should then be adapted accordingly.

APPENDIX 1

Detection of Points of Interest

General Principles

An object of the invention is thus to detect salient points of an image I. These points correspond to the pixels of I that belong to high frequency regions. To do this, use is made of wavelet theory [1], [2], [3], and [6].

Figure 1:
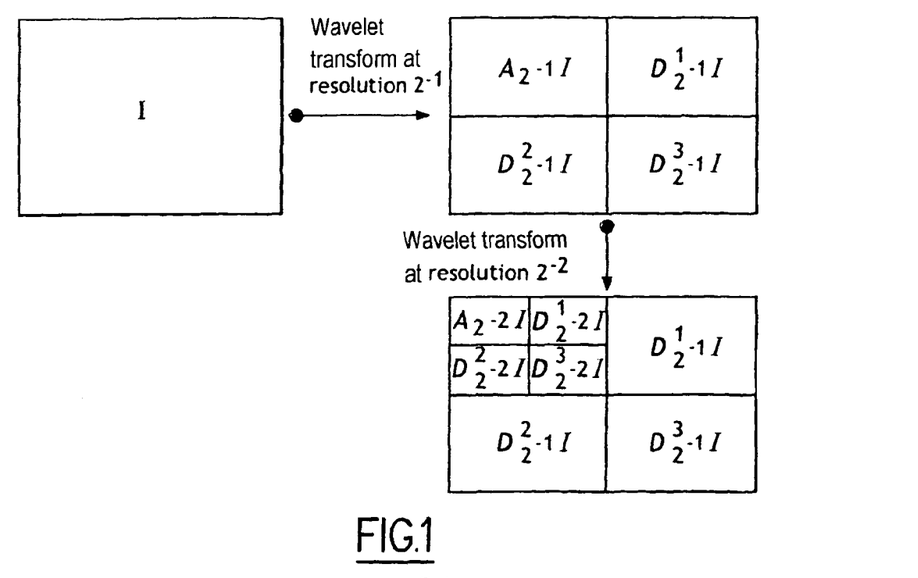
FIG. 1 shows the principle of multiresolution analysis of an image I using wavelet transformations.

The wavelet transformation is a multi-resolution representation of the image that enables the image to be expressed at different resolutions ½, ¼, etc. Thus, at each resolution level $2^j$ ($j \leq -1$), the wavelet transformation represents the image I of size n×m=$2^k \times 2^l$ (k, l∈Z) in the form:

of an approximate image $A_{2^j}I$;

of a detail image $D_{2^j}^1 I$ representing vertical high frequencies (i.e. horizontal outlines);

of a detail image $D_{2^j}^2 I$ representing horizontal high frequencies (i.e. vertical outlines); and of a detail image $D_{2^j}^3 I$ representing diagonal high frequencies (i.e. corners).

Each of these images is of size $2^{k+j} \times 2^{l+j}$. FIG. 1 shows this type of representation.

Figure 2:
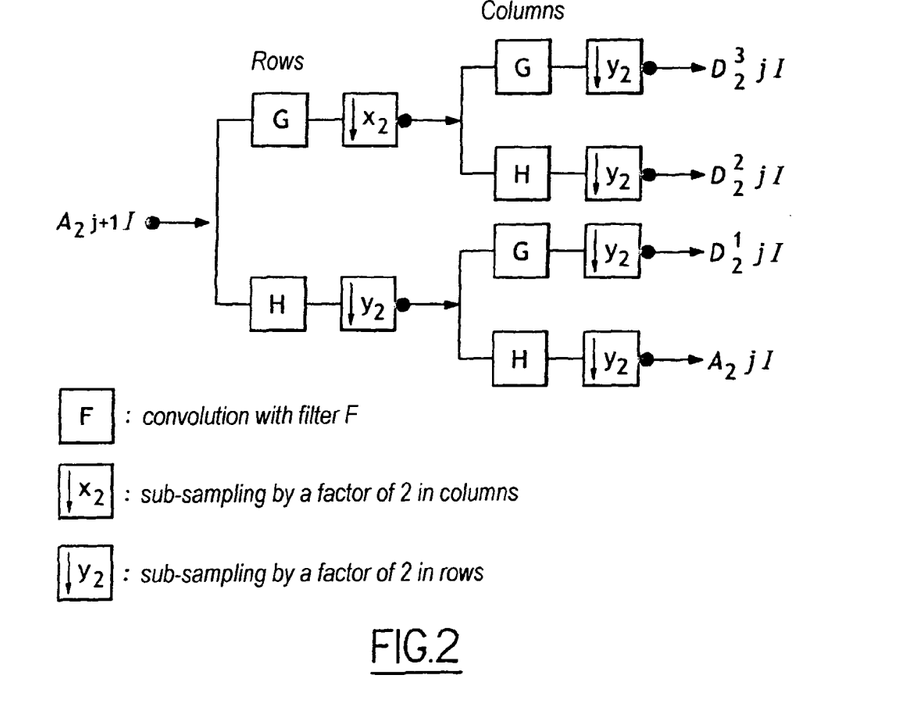
FIG. 2 is a diagram showing a wavelet transformation.

Each of these three images is obtained from $A_{2^{j+1}}I$ by filtering followed by sub-sampling by a factor of two in each direction as shown in FIG. 2. It should be observed that $A_{2^0}I=I$.

The invention then consists firstly in selecting a wavelet basis and a minimum resolution level $2^r$ ($r \leq -1$). Once the wavelet transformation has been performed, we propose going through each of the three detail images $D_{2^r}^1 I$, $D_{2^r}^2 I$, and $D_{2^r}^3 I$ in order to construct a tree of wavelet coefficients. This tree is based on the Zerotree approach [4], initially proposed for image encoding. It serves to establishes a salience map of size $2^{k+r} \times 2^{l+r}$ reflecting the importance of each wavelet coefficient at resolution $2^r$ ($r \leq -1$).

Thus, a coefficient having large salience corresponds to a region of I presenting high frequencies. A wavelet coefficient of large modulus at resolution $2^r$ ($r \leq -1$) corresponds to an outline of the image $A_{2^{r+1}}I$ in a particular direction (horizontal, vertical, or oblique). The Zerotree approach informs us that each of the wavelet coefficients at resolution $2^r$ corresponds to a zone in space of size $2^{-r} \times 2^{-r}$ in the image I.

On the basis of the salience map as constructed in this way, the invention proposes a method serving to select the pixel from the $2^{-r} \times 2^{-r}$ pixels of I that is the most representative of said zone.

Wavelet Transformation

The wavelet transformation is a powerful mathematical tool serving to perform multi-resolution analysis of a function [1], [2], [3].

In the invention, the functions under consideration are digital images, i.e. discrete two-dimensional functions. Without loss of generality, we assume that the images being processed are samples on a discrete grid of n rows and m columns with a value in brightness space that is sampled over 256 values. Furthermore, it is assumed that n=$2^k$ (k∈Z) and that m=$2^l$ (l∈Z).

If the original image is written I, then:

$$I: \begin{array}{l} [0, m] \times [0, n] \to [0, 255]. \\ (x, y) \mapsto I(x, y). \end{array}$$

As mentioned, the wavelet transformation of I obtains a multi-resolution representation of I. At each resolution level $2^j$ ($j \leq -1$), the representation of I is given by an approximate image, $A_{2^j}I$ and by three detail images $D_{2^j}^1 I$, $D_{2^j}^2 I$, and $D_{2^j}^3 I$. Each of these images is of size $2^{k+j} \times 2^{l+j}$. This process is illustrated in FIG. 2.

The wavelet transformation requires a scale function $\Phi(x)$ to be selected and also a wavelet function $\Psi(x)$. From these two functions, a scale filter H and a wavelet filter G are derived having respective impulse responses h and g defined by:

$$h(n) = \langle \phi_{2^{-1}}(u), \phi(u-n) \rangle \forall n \in Z,$$

$$\Phi_i^j(x) = \Phi(2^j x - i)$$

$$g(n) = \langle \psi_{2^{-1}}(u), \phi(u-n) \rangle \forall n \in Z,$$

$$\Psi_i^j(x) = \Psi(2^j x - i)$$

The filters constituting the mirrors of H and G are written respectively $\tilde{H}$ and $\tilde{G}$ (i.e. $\tilde{h}(n) = h(-n)$ and $\tilde{g}(n) = g(-n)$).

It can then be shown [1] (cf. FIG. 2) that:

$A_{2^j}I$ can be calculated as a convolution of $A_{2^{j+1}}I$ with $\tilde{H}$ in both dimensions while sub-sampling by a factor of two in both dimensions;

$D_{2^j}^1 I$ can be calculated by:
1. convoluting $A_{2^{j+1}}I$ with $\tilde{H}$ in the y direction and sub-sampling by a factor of two in said direction; and
2. convoluting the result of step 1) with $\tilde{G}$ in the x direction while sub-sampling by a factor of two in said direction.

$D_{2^j}^2 I$ can be calculated by:
1. convoluting $A_{2^{j+1}}I$ with $\tilde{G}$ in the y direction and sub-sampling by a factor of two in said direction; and
2. convoluting the result of step 1) with $\tilde{H}$ in the x direction while sub-sampling by a factor of two in said direction.

$D_{2^j}^3 I$ can be calculated by:
1. convoluting $A_{2^{j+1}}I$ with $\tilde{G}$ in the y direction and sub-sampling by a factor of two in said direction; and
2. convoluting the result of step 1) with $\tilde{G}$ in the x direction while sub-sampling by a factor of two in said direction.

Constructing the Tree of Wavelet Coefficients

Once the wavelet transformation has been performed as far the resolution $2^r$ ($r \leq -1$), the following are available:
an approximate image $A_{2^r}I$; and
three detail images $D_{2^j}^1 I$, $D_{2^j}^2 I$, and $D_{2^j}^3 I$ per level of resolution $2^j$ with $j = -1, \ldots, r$.

Figure 3:
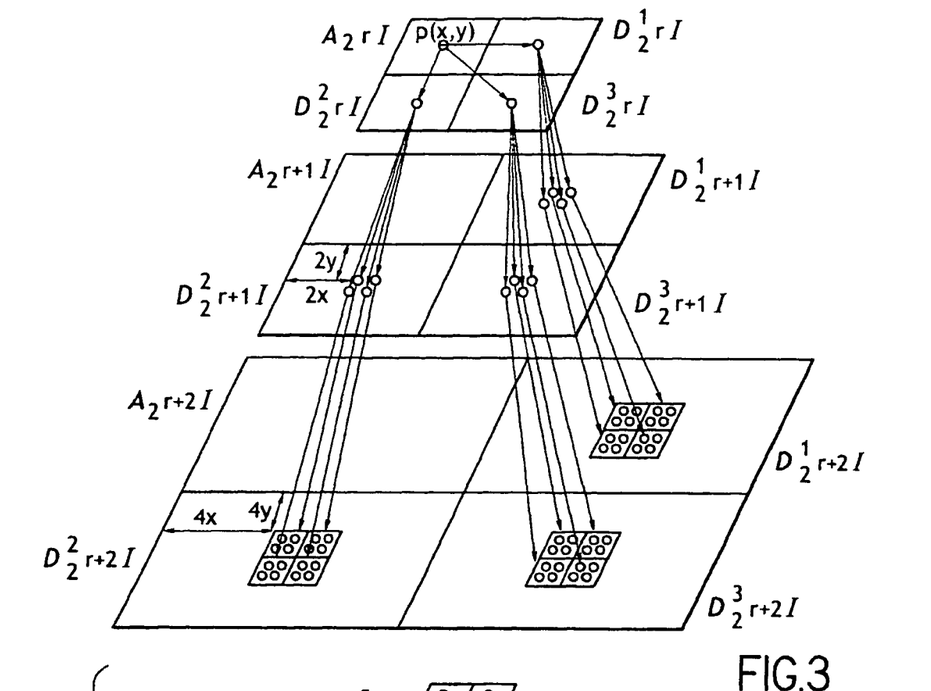
FIG. 3 shows a tree of wavelet coefficients.

A tree of wavelet coefficients is then constructed using the Zerotree technique [4]. The trees are constructed as follows (cf. FIG. 3):

each pixel p(x,y) of the image $A_{2^r}I$ is the root of a tree;
each root p(x,y) is allocated to three child nodes designated by the wavelet coefficients of the three detail images $D_{2^r}^s I$ (s=1, 2, 3) located at the same location (x,y); and
because of the sub-sampling by a factor of two that is performed by the wavelet transformation on each change of resolution, each wavelet coefficient $\alpha_{2^r}^s(x,y)$ (s=1, 2, 3) corresponds to a zone of size 2×2 pixels in the detail image corresponding to resolution $2^{r+1}$. This zone is located at (2x,2y) and all of the wavelet coefficients belonging thereto become child nodes of $\alpha_{2^r}^s(x,y)$.

A tree is constructed recursively in which each wavelet coefficient $\alpha_{2^u}^s(x,y)$ (s=1, 2, 3 and 0>u>r) possesses four child nodes designated by the wavelet coefficients of the image $D_{2^{u+1}}^s I$ located in a region situated at (2x,2y) and of size 2×2 pixels;

Once the tree has been constructed, each wavelet coefficient $\alpha_{2^r}^s(x,y)$ (s=1, 2, 3) corresponds to a region of size $2^{-r} \times 2^{-r}$ pixels in the detail image $D_{2^{-1}}^s I$.

Constructing Salience Maps

From the tree obtained by the preceding step, we propose constructing a set of −r salience maps (i.e. one salience map per level of resolution). Each salience map $S_{2^j}$ (j=−1, . . . , r) reflects the importance of the wavelet coefficients present at the corresponding resolution $2^j$. Thus, the more a wavelet coefficient is judged to be important in terms of the information is conveys, the greater will be the value of its salience.

It should be observed that each wavelet coefficient privileges one particular direction (horizontal, vertical, or oblique) depending on the detail image to which it belongs. However we have decided not to privilege any particular direction so we have therefore merged the information contained in the three wavelet coefficients $\alpha_{2^j}^1(x,y)$, $\alpha_{2^j}^2(x,y)$, $\alpha_{2^j}^3(x,y)$ regardless of resolution level $2^j$ and regardless of location (x,y) with $0 \leq x < 2^{k+j}$ and $0 \leq y < 2^{l+j}$. Each salience map $S_{2^j}$ is of size $2^{k+j} \times 2^{l+j}$.

Furthermore, the salience of each coefficient of resolution $2^j$ must take account of the salience of its descendents in the coefficient tree.

In order to take all of the properties into account, the salience of a coefficient located at (x,y) at resolution $2^j$ is given by the following recursive relationship:

$$\begin{cases} S_{2^{-1}}(x,y) = \alpha_{-1}\left(\frac{1}{3}\sum_{u=1}^{3}\frac{D_{2^{-1}}^u(x,y)}{\text{Max}(D_{2^{-1}}^u)}\right) \\ S_{2^j}(x,y) = \frac{1}{2}\left(\begin{array}{l}\alpha_j\left(\frac{1}{3}\sum_{u=1}^{3}\frac{D_{2^j}^u(x,y)}{\text{Max}(D_{2^j}^u)}\right) + \\ \frac{1}{4}\sum_{u=0}^{1}\sum_{v=0}^{1}S_{2^{j+1}}(2x+u, 2y+v)\end{array}\right) \end{cases}$$

Equation 1: expression for the salience of a coefficient where:
max($D_{2^j}^s$) (s=1, 2, 3) denotes the maximum value of the wavelet coefficients in detail image $D_{2^j}^2 I$;
$\alpha_k$ ($0 \leq \alpha_k \leq 1$) serves to adjust the importance of the salience coefficients depending on the level of resolution. It should be observed that:

$$\sum_k \alpha_k = 1$$

it is important to observe that the salience values are normalized (i.e. $0 \leq S_{2^j}(x,y) \leq 1$.

As can be seen in equation 1, the salience of a coefficient is a linear relationship of wavelet coefficients. As mentioned, we consider salient points as image pixel belonging to high frequency regions. A wavelet coefficient $\alpha_{2^j}^s(x,y)$ (s=1, 2, 3) that is high at resolution $2^j$ designates a high frequency zone in the image $A_{2^{j+1}}I$ at location (2x,2y). Since detail images are obtained by highpass filtering of the image $A_{2^{j+1}}I$, each outline of $A_{2^{j+1}}I$ generates a high wavelet coefficient in one of the detail images at the resolution $2^j$ and corresponding to the orientation of the outline.

Thus, the formulation of the salience of a coefficient given in the equation . . .

Selecting Salient Points

Once the construction of salience maps has been completed, we propose a method of selecting the most salient points in the original image.

Figure 4:
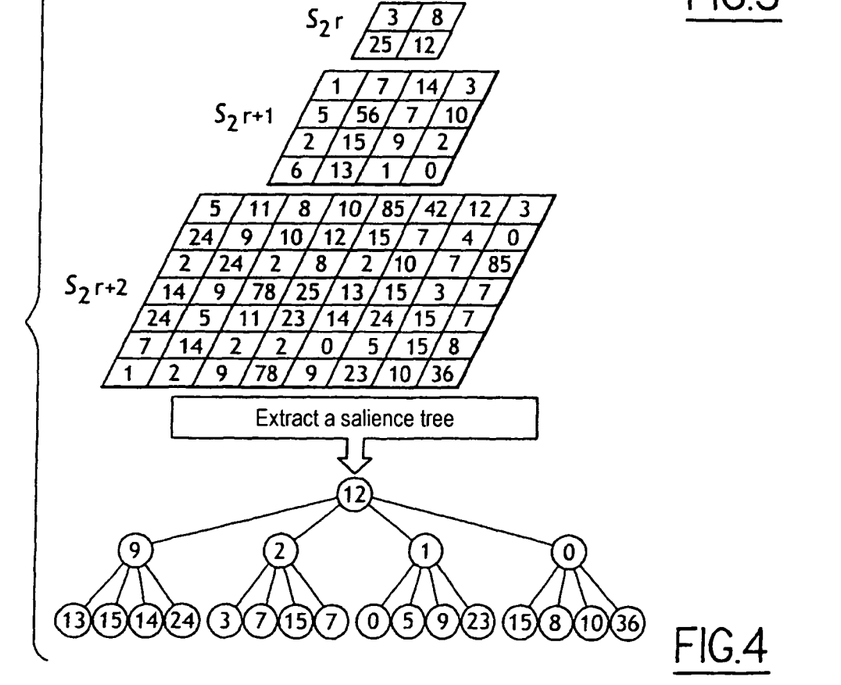
FIG. 4 shows an example of salience maps and of corresponding salience trees.

To do this, we construct a tree of salient values from the −r salience maps that have been constructed. In a manner analogous to constructing the tree of wavelet coefficients, we construct $2^{k+l+2r}$ trees of salient coefficients, each having at its root a coefficient of $S_{2^r}$. As for the Zerotree technique, each of these coefficients corresponds to a zone having size 2×2 coefficients in the map $S_{2^{r+1}}$. It is then possible to construct recursively the tree in which each node is associated with four child nodes in the salience map at the next higher resolution. FIG. 4 illustrates this construction.

In order to locate the most salient points in I, we proceed as follows:

1. sorting the $2^{k+l+2r}$ salient values present in $S_{2^r}$ in decreasing order; and
2. selecting the branch having the greatest salience in each of the $2^{k+l+2r}$ trees as sorted in this way.

Figure 5:
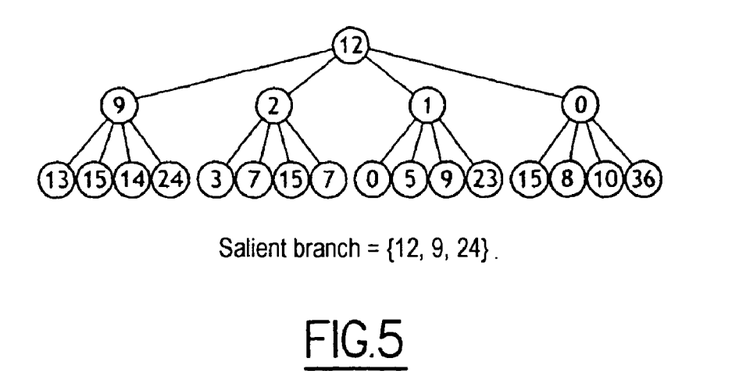
FIG. 5 shows the salience of one branch of the FIG. 4 tree.

In order to select this branch, we propose working through the tree from the root in which we select at each level of the tree the child node having the most important salience value (cf. FIG. 5). This produces a list of −r salience values:

$$\text{Salient branch} = \{s_{2^r}(x_1,y_1), s_{2^{r+1}}(x_2,y_2), L, s_{2^{-1}}(x_{-r},y_{-r})\}$$

with $$(x_k,y_k) = \text{ArgMax}\{s_{2^{r+(k-2)}}(2x_{k-1}+u, 2y_{k-1}+v), 0 \leq u \leq 1, 0 \leq v \leq 1\}$$

From the most salient branches of each tree, the pixel of I that is selected as being most representative of the branch is located at $2x_{-r}, 2y_{-r}$. In practice, only a subset of the $2^{k+l+2r}$ trees is passed through. In numerous applications, a search is made for a fixed number n of salient points. Under such circumstances, it suffices to pass through only the n trees having the n most salient roots.

Selecting the Wavelet Transformation

As mentioned, it is necessary to begin by selecting a wavelet basis and a minimum resolution level $2^r$ ($r \leq -1$). For this particular implementation, we propose using the Haar basis and $r = -4$.

The Haar basis is defined by:

$$\phi(x) = \begin{cases} 1 & \text{if } 0 \leq x < 1 \\ 0 & \text{else} \end{cases}$$

for the scale function and by:

$$\psi(x) = \begin{cases} 1 & \text{if } 0 \leq x < \frac{1}{2} \\ -1 & \text{if } \frac{1}{2} \leq x < 1 \\ 0 & \text{else} \end{cases}$$

for the wavelet function.

Constructing the Tee of Wavelet Coefficients

In this step, no parameter is required. The process is thus as described.

Constructing the Salience Maps

In this step, it is necessary to select the parameters $\alpha_k$ ($-1 \geq k \geq r$) in order to adjust the importance given to the salience coefficients depending on the resolution level to which they belong.

In this particular implementation, we propose using:

$$\alpha_k = (-1/r) \forall k \epsilon [r,-1]$$

Figure 6A:
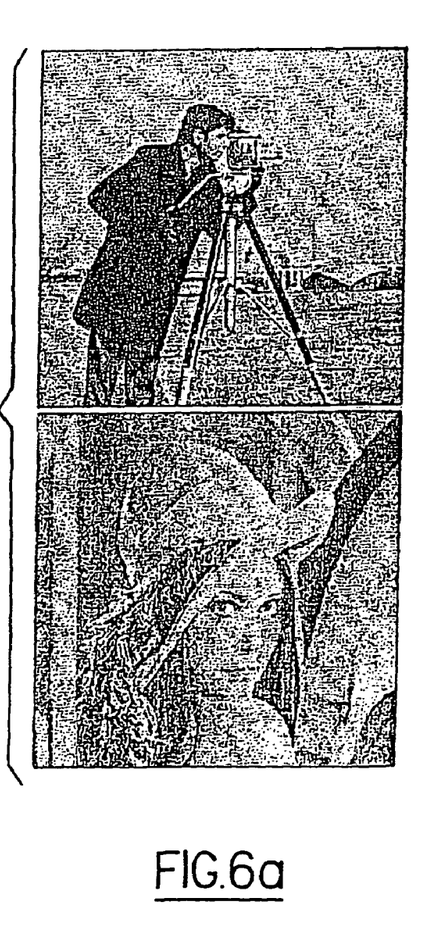
FIGS. 6a and 6b show experimental results of the method, FIG. 6a presenting two original images and FIG. 6b the corresponding salient points.
Figure 6B:
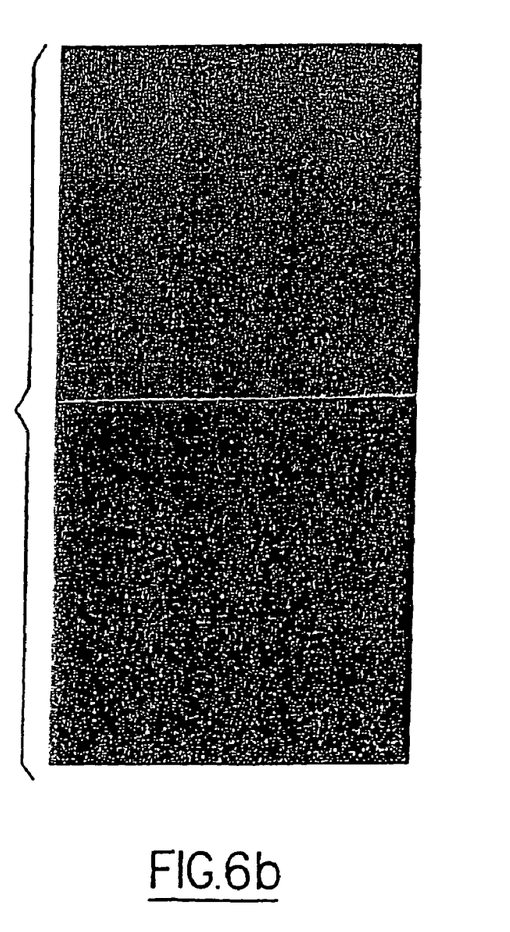

The results obtained on natural images using the parameters proposed in this particular implementation are shown in FIG. 6.

APPENDIX 2

Foveal Wavelets

1. Definitions

Definition 1: a space $V_0 \subset L^2(R)$ is a foveal space centered on 0 if there exists a finite generating family $\{\psi^m\}$ $1 \leq m \leq M$ belonging to $L^2(R)$ such that $\{\psi_j^m\}$ $1 \leq m \leq M, j \epsilon Z$ is a Riesz basis of $V_0$ and such that:

$$f \epsilon V_0 \Rightarrow f \cdot 1_{[0,+\infty[} \epsilon V_O$$

(where R designates the set of real numbers and Z the set of positive and negative natural integers).

Definition 2: let $f': R \rightarrow R$ defined from f by $\forall t \epsilon R$, $f'(t) = f(t+u)$, be a foveal space centered on u if it satisfies $f \epsilon V_u \Leftrightarrow f' \epsilon V_0$.

The projection of a function f on $V_u$ is then a function of resolution that decreases on going away from the foveal u, whence the analogy with the foveal nature of human vision.

2. Foveal Wavelet Basis in the Continuous Case

Let $\phi$ be an even function with $\int \phi(t) \cdot dt \neq 0$. $V_0$ is resolved into two sub-spaces $V_0^e$ and $V_0^o$ made up respectively of even functions and odd functions. By defining:

$$\psi^1(t) = (\phi(t) - \phi(2t)) \cdot \text{sign}(t) = \overline{\phi}(t) - \overline{\phi}(2t)$$

$$\psi^2(t) = \phi(t) - 2 \cdot \phi(2t)$$

where sign(t) is the sign function of the real variable t, equal to +1 for t greater than 0 and equal to −1 for t less than 0, it is shown in reference [5] that $\{\psi_j^1\}$ $j \epsilon Z$ is a Riesz basis of $V_0^o$ and that $\{\psi_j^2\}$ $j \epsilon Z$ is a basis of $V_0^e$. Since $V_0^o$ and $V_0^e$ are orthogonal supplementaries, it can be deduced therefrom that $\{\psi_j^1, \psi_j^2,\}$ $j \epsilon Z$ is a basis of $V_0$ (foveal wavelet basis).

Since the bases $\{\psi_j^1\}$ $j \epsilon Z$ and $\{\psi_j^2\}$ $j \epsilon Z$ are not always orthogonal on construction, it is possible to make use of the Bram-Schmidt orthogonalization technique.

3. Foveal Wavelets in the Discrete Case

In this section, we describe the procedure of constructing a basis of foveal wavelets that are discrete in n, as developed in reference [5]. The signals under consideration are sampled at $t = n - \frac{1}{2}$. The origin $t = 0$ is then to be found between $n = 0$ and $n = 1$. Furthermore, the following notation is used below:

$$\overline{f}[n] = f[n] \cdot \text{sign}\left(n - \frac{1}{2}\right)$$

$$f^-[n] = f[n] \cdot 1_{]-\infty,\frac{1}{2}]}(n)$$

$$f^+[n] = f[n] \cdot 1_{[\frac{1}{2},+\infty[}.$$

Definition 3: if a family of discrete foveal windows $\{\phi_j[n]\}$ $0 \leq j \leq s$ satisfies:

$$\phi_j[n] = \phi_j[1-n]$$

there exists $K > 0$ such that the support of $\phi_j[n]$ is $[-K2^j+I, K2^j]$ there exists $C > 0$ such that $$\sum_{n=0}^{+\infty} \phi_j[n] = C2^{j/2},$$

then the family $\{\phi_j^-, \phi_j^+\}$ $0 \leq j \leq s$ is a basis of the foveal space $V_{0,s}$, said foveal space $V_{0,s}$ corresponding to the discrete functions sub-sampled up to sub-sampling level j=s.

By analogy with the continuous case of the paragraphs above, if the following are defined:

$$\psi_j^1[n] = \overline{\phi}_j[n] - 2^{-1/2}\overline{\phi}_{j-1}[n]$$

$$\psi_j^2[n] = \phi_j[n] - 2^{1/2}\phi_{j-1}[n]$$

it is shown in reference [5] that the family $\{\overline{\phi}_0, \psi_j^1\}$ $1 \leq j \leq s$ is an odd foveal wavelet basis of $V_{0,s}{}^o$ and $\{\psi_j^2, \phi_s\}$ $1 \leq j \leq s$ is an even foveal wavelet basis of $V_{0,s}{}^e$.

On construction, these bases are not necessarily orthogonal. Nevertheless, it is also possible to apply a Gram-Schmidt orthogonalization procedure.

In the above, the mother functions $\phi$ are selected by way of example from spline functions.

Spline functions are in very widespread use in the field of interpolation. They make it possible to interpolate a sequence of points by pieces of polynomial functions. The order of the interpolating polynomials corresponds to the order of the spline function used for interpolation.

Definition 4: a spline function of order 0 is $\phi^0 = 1_{[-1,1]}$. Spline functions of higher order are defined recursively by $\phi^P(t) = \int_{-\infty}^t (\phi^{p-1}(2x) - \phi^{p-1}(x)) \text{sign}(x) dx$.

Figure 9:
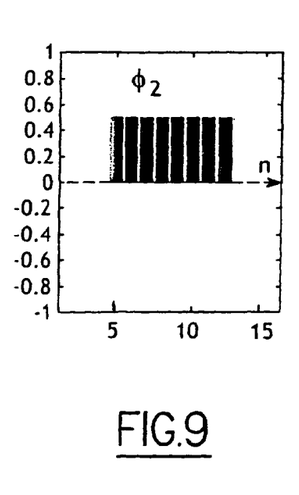
FIG. 9 shows the function $\Phi_2(n)$ for the discrete variable n used in the characterization method of the invention.
Figures 10, 11:
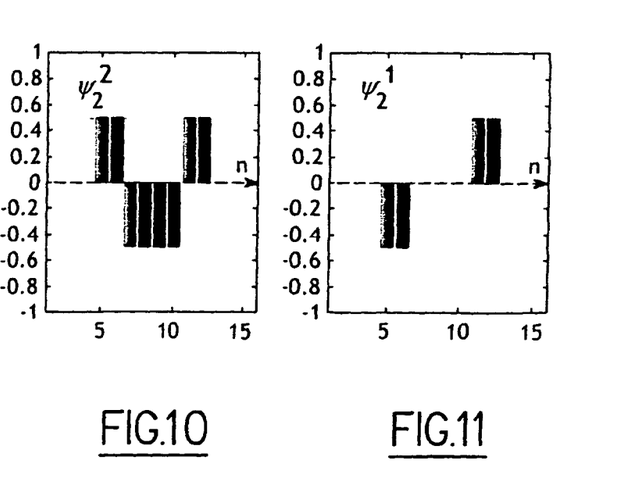
FIG. 10 shows the function $\psi_2^{(2)}(n)$ of the discrete variable n, used in the characterization method of the invention.
FIG. 11 shows the function $\psi_2^{(1)}(n)$ of the discrete variable n, used in the characterization method of the invention.

It is then possible to use these functions to construct foveal wavelet basis. An example of a foveal wavelet basis obtained using 0 order splines (staircase functions) is shown in FIGS. 9, 10, and 11 representing respectively $\phi_2(n), \psi_2^2(n)$ and $\psi_2^1(n)$. Since The foveal wavelet basis obtained from splines of order higher than 0 are not orthogonal by default, it is necessary to apply a Gram-Schmidt orthogonalization procedure.

APPENDIX 3

List of References

[1] Mallat S., "*A Theory for Multiresolution Signal Decomposition: the Wavelet Representation*", IEEE Transactions on Pattern Analysis and Machine Intelligence, Vol. 11, No 7, July 1989, pp. 674-693.

[2] Stollnitz E. J., DeRose T. D., Salesin D., "*Wavelets for Computer Graphics: A Primer-Part 1*", IEEE Computer Graphics and Applications, May 1995, pp. 76-84.

[3] Stollnitz E. J., DeRose T. D., Salesin D., "*Wavelets for Computer Graphics: A Primer-Part 2*", IEEE Computer Graphics and Applications, July 1995, pp. 75-85.

[4] Shapiro J. M., "*Embedded Image Coding Using Zerotrees of Wavelet Coefficients*", IEEE Transactions on Signal Processing, Vol. 41, No 12, December 1993, pp. 3445-3462.

[5] S. Mallat, "*Foveal detection and approximation for singularities*", submitted to Applied and Computational Harmonic Analysis, vol 14, pp. 133-180, 2003.

[6] Christophe Laurent, Nathalie Laurent and Muriel Visani, "*Color Image Retrieval based on Wavelet salient features detection*", CBMI 2003, Third International Workshop on Content-Based Multimedia Indexing, Rennes, France.

[7] Mark S. Drew, Jie Wei, and Ze-Nian Li, "*Illumination-invariant color object recognition via compressed chromaticity histograms of color-channel-normalized images*", in ICCV, International Conference on Computer Vision 98, pages 533-540, 1998.

[8] F. Mindru, T. Moons, and L. Van Gool, "*Recognizing color patterns irrespective of viewpoint and illumination*", IEEE, pages 368-373, 1999.

[9] Graham D. Finlayson, Subho S. Chatterjee, and Brian V. Funt, "*Color angular indexing*", In ECCV (2), pages 16-27, 1996.

[10] B. S. Manjunath and W. Y. MA, "*Texture features for browsing and retrieval of image data*", In IEEE transactions on pattern analysis and machine intelligence, volume 18, no 8, pages 837-842, August 1996.

[11] L. Cieplinski, M. Kim, J. R. Ohm, M. Pickering and A. Yamada, "*Text of ISO/IEC 15938-3/FCD Information technology—Multimedia content description interface—Part 3 Visual*", Tech. Rep N4062, ISO/IEC JTC1/SC29/WG11, Singapore, 2001.

[12] Jack E. Bresenham, "*Algorithm for Computer Control of a Digital Plotter*", IBM Systems Journal, vol. 4, no 1:25-30, 1965.

The invention claimed is:

1. A characterization method for characterizing a digital image in which at least one point of interest (PI) in the digital image is detected in association with a region of the image presenting high frequencies, the method being characterized by the steps of:

selecting a first determined two-dimensional working region (RPI) of the image digital, of size smaller than the size of the image and containing the detected point (PI);

for each (θ) of a plurality (I) of different prescribed orientations in the digital image:

extracting a family $(\{f_\theta^{(k)}(n)\}_{1 \leq k \leq K})$ of one-dimensional lines $(f_\theta^{(k)}(n))$ of points from the first two-dimensional working region (RPI) along straight lines (K) having said orientation (θ); and calculating for each one-dimensional line $((f_\theta^{(k)}(n))$ of points of the extracted family and for each sub-sampling level (s) selected from prescribed sub-sampling levels, a foveal energy signal $(E_{\theta,s}^{(k)}(n))$ using foveal wavelets; and combining the foveal energy signals $(E_{\theta,s}^{(k)}(n))$ on the lines and on their arguments to calculate a foveal signature (SI) depending on the orientations (θ) and the levels (s) of sub-sampling and characterizing the working region.

2. A characterization method according to claim 1, characterized in that the foveal energy signal $E_{\theta,s}^{(k)}(n)$ is equal to:

$$E_{\theta,s}^{(k)}(n) = \left| \sum_m f_\theta^{(k)}(m) \cdot \psi_s^{(1)}(n-m) \right|^2 + \left| \sum_m f_\theta^{(k)}(m) \cdot \psi_s^{(2)}(n-m) \right|^2$$

where:

$\{f_{74}{}^{(k)}(n)\}_{1 \leq k \leq K}$ designates said family of said K one-dimensional lines $f_{74}{}^{(k)}(n)$ of points extracted for each orientation θ;

K is a natural integer prescribed for each orientation θ;

s designates each level of sub-sampling amongst said J prescribed levels of sub-sampling;

n designates the argument of the foveal energy signals $E_{\theta,s}^{(k)}(n)$; and $\{\psi_j^{(1)}, \psi_j^{(2)}\}_{1 \leq j \leq s}$ is a basis of said foveal wavelets, going as far as sub-sampling level s, of the foveal space $V_s$ of discrete one-dimensional signals $\{\psi_j^{(1)}\}_{1 \leq j \leq s}$ being a basis of odd foveal wavelets and $\{\psi_j^{(2)}\}_{1 \leq j \leq s}$ being a basis of even foveal wavelets.

3. A characterization method according to claim 2, characterized in that the basis of odd foveal wavelets $\{\psi_j^{(1)}\}_{1 \leq j \leq s}$ is defined by:

$$\psi_j^{(1)}(n) = \Phi_j(n) \cdot \text{sign}(n-\tfrac{1}{2}) - 2^{-1/2} \cdot \Phi_{j-1}(n) \cdot \text{sign}(n-\tfrac{1}{2})$$

the basis of even foveal wavelets $\{\psi_j^{(2)}\}_{1 \leq j \leq s}$ is defined by:

$$\psi_j^{(2)}(n) = \Phi_j(n) - 2^{1/2} \cdot \Phi_{j-1}(n)$$

where:
sign(t) is the sign function of the real variable t, equal to +1 for t greater than 0 and equal to −1 for t less than 0; and
$\Phi_j(t)$ being the even function of the real variable t satisfying;

$$\int_{-\infty}^{+\infty} \Phi_0(t) \cdot dt \neq 0.$$

4. A characterization method according to claim 3, characterized in that the foveal wavelet basis $\{\psi_j^{(1)}, \psi_j^{(2)}\}_{1 \leq j \leq s}$ are constructed from spline functions $\Phi_j(t)$ defined by:

$$\Phi_0(t) = 1 \text{ for } -1 \leq t \leq +t, \text{ and } 0 \text{ elsewhere; and}$$

$$\Phi_0(t) = \int_{-\infty}^{t} (\Phi_{j-1}(2x) - \Phi_{j-1}(x)) \cdot \text{sign}(x) \cdot dt \text{ for } j \geq 1.$$

5. A characterization method according to claim 1, characterized in that said foveal signature (SI) is calculated by statistically processing foveal energy signals $(E_{\theta,s}^{(k)}(n))$ on the lines and on their arguments (n).

6. A characterization method according to claim 1, characterized in that said foveal signature SI is equal to:
SI=$(\mu_{is}, \sigma_{is})_{1 \leq i \leq I, 1 \leq s \leq J}$ with
$\mu_{is} = (1/NM) \cdot \Sigma_k \Sigma_n E_{i,s}^{(k)}(n)$ corresponding to the mean of the foveal energy signal $E_{i,s}^{(k)}(n)$ for the orientation i and the sub-sampling level s over the working region (RPI);
$\sigma_{is} = (1/NM) \cdot [\Sigma_k \Sigma_n (E_{i,s}^{(k)}(n) - \mu_{is})^2]^{1/2}$ corresponding to the standard deviation of the foveal energy signal $E_{i,s}^{(k)}(n)$ for the orientation i and the sub-sampling level s over the working region (RPI); and
NM corresponds to the size of the working region (RPI).

7. A characterization method according to claim 1, characterized in that the family $\{f_\theta^{(k)}(n)\}_{1 \leq k \leq K}$ of one-dimensional lines $(f_\theta^{(k)}(n))$ of points along straight lines from the first two-dimensional working region (RPI) is extracted using the Bresenham algorithm enabling sloping straight lines to be plotted on a discrete grid.

8. A characterization method according to claim 1, characterized in that the first two-dimensional working region (RPI) surrounds the detected point (PI) and is of a size (NM) that is less than one-tenth of the size of the digital image.

9. A characterization method according to claim 1, characterized in that the first two-dimensional working region (RPI) surrounds the detected point (PI) and is of a size (NM) less than or equal to 15 pixels×15 pixels.

10. A characterization method according to claim 1, characterized in that said plurality (I) of different prescribed orientations in the digital image subdivide the angular sector going from −90° to +90° relative to the horizontal in equal angles.

11. A characterization method according to claim 1, characterized in that the number (I) of said orientations is eight.

12. A characterization method according to claim 1, characterized in that the foveal signature is associated with the digital image and is stored in memory in association with said digital image.

13. The application of the characterization method according to claim 1 to digital images for comparison purposes, in which the foveal signatures calculated for the digital images are compared with one another.

14. The application according to claim 13, characterized in that a reference foveal signature is calculated for a reference image and, in order to compare foveal signatures, a distance relative to the reference signature is calculated for the foveal signatures calculated for the other images, the image closest to the reference image being the image having the shortest distance relative thereto.

15. The application according to claim 14, characterized in that a prescribed number of the images closest to the reference image are selected.

16. The application of the characterization method according to claim 1 to recognizing shapes in the digital image, in which the foveal signature is used to characterize a shape situated in the working region.

17. The application according to claim 16, to recognizing faces, in which the foveal signature is used to characterize a feature of the face, situated in the working region.

18. The application of the characterization method according to claim 1 to indexing digital images by partial request, in which digital images containing an item specified by the request are extracted from a digital image base, a digital image being determined as containing said item when the distance of the foveal signature calculated for said image relative to the foveal signature calculated for the item situated at least in part in the working region is less than a prescribed threshold.

19. The application of the characterization method according to claim 1, to classifying digital images by comparing their foveal signatures.

\* \* \* \* \*